United States Patent Office 2,776,999
Patented Jan. 8, 1957

2,776,999

MANUFACTURE OF CUMENE HYDROPEROXIDE

George G. Joris, Madison, N. J., assignor to Allied Chemical & Dye Corporation, New York, N. Y., a corporation of New York No Drawing. Application November 20, 1952,
Serial No. 321,720

12 Claims. (Cl. 260—610)

This invention relates to a process for the manufacture of cumene hydroperoxide and more particularly to an improvement in manufacturing it by oxidizing liquid cumene with elemental oxygen, especially the oxygen of air.

Under identical experimental conditions a series of reactions between elemental oxygen and liquid cumene is capable of yielding varying proportions of dimethyl phenyl carbinol, acetophenone, acids, degradation products, etc., as well as cumene hydroperoxide. Moreover, the rates of formation and yields of cumene hydroperoxide obtained from liquid phase air oxidation of various commercial cumene samples are pronouncedly erratic. In addition, there is an observable induction period varying somewhat with temperature as well as the source and pretreatment of the cumene. These effects indicate that minor amounts of foreign substances may exert inhibitor, catalyzer or cumene hydroperoxide decomposition accelerator activity.

An object of this invention is to suppress the irregularities normally present in cumene oxidation to make specifically cumene hydroperoxide and, additionally, to increase the rate of formation and yield of cumene hydroperoxide (based on cumene reacted).

Another object of this invention is to provide additives which enhance operation at atmospheric pressure with reaction temperatures on the order of 100° C., thus effecting the oxidation of cumene to the hydroperoxide with rapidity, economy, and safety.

Still another object of this invention is to provide additives which are easily separated from the reaction mixture and readily made reusable for subsequent oxidations.

Yet another object of this invention is to provide additives which will function effectively when employed over a broad range of concentration to permit operation without delicate attention to this phase of operation.

In accordance with my invention I contact cumene during oxidation thereof in liquid phase by elemental oxygen with a normal salt of a strong metallic base and a strong mineral acid, said acid having molecular weight less than 100, said salt being present in solid phase under reaction conditions. By a strong metallic base I mean specifically alkali metal or alkaline earth metal base including magnesium. By a strong mineral acid I mean a mineral acid such as sulfuric acid which is more than 50% ionized in dilute aqueous solution, e. g. at normality of ½ to 1, at room temperature, e. g. at 18°-25° C. Suitably, such salt is suspended in the reaction mixture as a powder.

Salts of the above type are marked by their overall stability under the reaction conditions. They are essentially neutral in water solution. They do not hydrolyze to form acids which can be deleterious to the reaction, nor are they lost by decomposition or volatility during reaction. They are free of heavy metal constituents which are known to catalyze dimethyl phenyl carbinol formation. And they are in a relatively stable state of oxidation, thus immune to oxidation under the conditions of the reaction.

The most common salts of this type are the chlorides, bromides, sulfates, and nitrates of the strong metallic bases. Typical salts which can be used in the practice of my invention are barium sulfate, magnesium sulfate, calcium chloride, sodium bromide, potassium bromide, sodium nitrate, and potassium nitrate. Preferred salts are those which not only give high yields and rates of formation of cumene hydroperoxide, but which also do not form hydrates and are readily separable from the hydrocarbon reaction mixture by filtration or by water extraction. Preferred salts, therefore, are sodium chloride, barium sulfate, potassium nitrate, potassium chloride, and sodium nitrate.

It is not necessary that these salts be in their purest commercially obtainable state to be effective in the practice of my invention. I can use, for example, various grades of blanc fixe (a commercial barium sulfate) and ordinary uniodized table salt. For best yields when practicing my invention, contamination of the reaction mixture with various heavy metal impurities, organic acids, and phenols should be avoided. It is sometimes of advantage to employ basically-reacting materials such as soda ash or calcium carbonate in conjunction with the instant neutral salt additives in order to neutralize possibly deleterious acidic substances which may be present in the reaction mixture.

I prefer to operate my process at atmospheric pressure since I have found it permits producing the hydroperoxide at good rate and in high yield. Elevation of pressure gives no particular advantage in these respects. Because of its effectiveness and economy for my purpose, I prefer to use air to perform the oxidation. Richer sources of elemental oxygen may also be used.

Temperatures as low as 75° C. and as high as 120° C. can be used in the practice of my invention. Temperatures in the range from about 90° C. to about 110° C. give optimum yield and rate in my process and are those preferred. At temperatures below 90° C. the reaction tends to be sluggish; above 120° C. decomposition of the hydroperoxide into dimethyl carbinol and acetophenone begins to increase substantially.

To secure efficient contact with the cumene undergoing oxidation and to have the least amount of additive handling, I prefer to use the additive in a powdered state rather than in the form of lumps or pellets. Preferred concentrations of powdered additives are in the range of 1–2 grams per 100 cc. of reaction mixture, these concentrations being of high effectiveness in my process. While I can use concentrations as high as 20 grams per 100 cc., or even higher, such concentrations are less desirable because dispersion of the additive in and separation of it from the reaction mixture require more effort, and yield of cumene hydroperoxide is, in some cases, adversely affected. Lower concentrations, e. g., about 0.1 gram per 100 cc., or even less, can also be used with beneficial effect, the effectiveness gradually diminishing as the proportion of additive is reduced.

In operation the additive gradually becomes coated with a dark film of impurities and slowly loses its efficiency. It may be separated from the reaction mixture either continuously or batch-wise and reclaimed, as for example by filtering followed by rinsing to remove the film of impurities, then air drying. Acetone and other common solvents are satisfactory rinsing fluids for such treatment. Water-soluble additives can be extracted with water, crystallized, and dried.

One advantage of using the preferred additives in the oxidation of cumene is that the reaction is substantially unaffected by the presence or absence of water and caking of the additive due to moisture is not apt to occur; accordingly, precautions need not be taken to exclude water during the oxidation, nor need water be present.

Suitable materials of construction for the oxidation reactor are glass, stainless steel types 304 and 316, and aluminum type 3S. For best yields ordinary iron and steel vessels are to be avoided. Copper salts such as those usually present on the surface of copper reactors are highly deleterious since they catalyze the decomposition of hydroperoxide in my process.

The following examples are illustrative of my invention, but it is not intended that the invention be limited thereto. The cumene samples employed in these examples were of high oxidizability to cumene hydroperoxide. Each sample was oxidized by bubbling dried air therethrough in a glass reaction vessel maintained at reaction temperature specified below. The additives employed were in the form of solid powder suspended in the reaction mixture. Rate of formation of cumene hydroperoxide is expressed as weight percent concentration of cumene hydroperoxide formed in the reaction vessel per hour during each time interval. Yields of cumene hydroperoxide were determined iodometrically and corrected for systematic error.

Example 1.—A 100 cc. sample of cumene was oxidized as outlined above at 100° C. in the presence of 1 gram of sodium chloride. The table below summarizes the rates of formation of cumene hydroperoxide at various intervals over a period of 16½ hours. When no additive is employed to oxidize similar cumene samples under the above conditions, yields and rates are much lower than those of the table.

| Cumulative Time (Hours) | Concentration (Weight percent cumene hydroperoxide in reaction mixture) | Rate |
|---|---|---|
| 0 | 0 | |
| 4 | 2.05 | 0.51 |
| 12 | 13.47 | 1.43 |
| 16.5 | 21.96 | 1.89 |

Overall rate of formation of cumene hydroperoxide was 1.33. The molar yield of cumene hydroperoxide based on cumene reacted was 95%.

Example 2.—A 100 cc. sample of cumene was oxidized in the presence of 0.125 gram of sodium chloride as outlined above at 110° C. in the range of zero to 10 weight percent cumene hydroperoxide concentration in the reaction mixture, and at 100° C. in the range of 10 to 20 weight percent hydroperoxide concentration. The table below summarizes the rates of formation of cumene hydroperoxide at various time intervals over a period of 12 hours.

| Cumulative Time (Hours) | Concentration (Weight percent cumene hydroperoxide in reaction mixture) | Rate |
|---|---|---|
| 0 | 2.18 | |
| 1.5 | 3.97 | 1.19 |
| 4 | 8.16 | 1.68 |
| 5 | 10.01 | 1.85 |
| 12 | 19.39 | 1.34 |

Overall rate of formation of cumene hydroperoxide was 1.61. The molar yield of cumene hydroperoxide based on cumene reacted was 95.5%. Similar results can be obtained by the use of potassium chloride in place of sodium chloride.

Example 3.—A 200 cc. sample of cumene was oxidized as outlined above at 110° C. in the presence of 4 grams of blanc fixe (a commercial barium sulfate). The table below summarizes the rates of formation of cumene hydroperoxide at various time intervals over a period of 7.25 hours.

| Cumulative Time (Hours) | Concentration (Weight percent cumene hydroperoxide in reaction mixture) | Rate |
|---|---|---|
| 0 | 0 | |
| 2.0 | 1.365 | 0.68 |
| 4.0 | 4.28 | 1.46 |
| 6.0 | 8.30 | 2.01 |
| 7.25 | 11.18 | 2.30 |

Overall rate of formation of cumene hydroperoxide was 1.53. The molar yield of cumene hydroperoxide based on cumene reacted was 98%.

Example 4.—A 200 cc. sample of cumene was oxidized as outlined above at 90° C. in the presence of 2 grams of blanc fixe (a commercial barium sulfate) and 2 grams of soda ash. The table below summarizes the rates of formation of cumene hydroperoxide at various time intervals over a period of 38½ hours.

| Cumulative Time (Hours) | Concentration (Weight percent cumene hydroperoxide in reaction mixture) | Rate |
|---|---|---|
| 0 | 0.00 | |
| 2 | 0.52 | 0.26 |
| 7 | 2.94 | 0.48 |
| 16 | 8.45 | 0.61 |
| 24 | 15.23 | 0.85 |
| 38.5 | 28.9 | 0.94 |

Overall rate of formation of cumene hydroperoxide was 0.75. The molar yield of cumene hydroperoxide based on cumene reacted was 96.5%.

Example 5.—A 100 cc. sample of cumene was oxidized as outlined above at 100° C. in the presence of 1 gram of sodium bromide. The table below summarizes the rates of formation of cumene hydroperoxide at various time intervals over a period of 50½ hours.

| Cumulative Time (Hours) | Concentration (Weight percent cumene hydroperoxide in reaction mixture) | Rate |
|---|---|---|
| 0 | 0 | |
| 4 | 0.87 | .217 |
| 12 | 9.45 | 1.07 |
| 19¼ | 20.52 | 1.53 |

Overall rate of formation of cumene hydroperoxide was about 1.06. The molar yield of cumene hydroperoxide based on cumene reacted was 96%.

Example 6.—A 100 cc. sample of cumene was oxidized as outlined above at 100° C. in the presence of 1 gram of calicum chloride. The table below summarizes the rates of formation of cumene hydroperoxide at various time intervals over a period of 9 hours.

| Cumulative Time (Hours) | Concentration (Weight percent cumene hydroperoxide in reaction mixture) | Rate |
|---|---|---|
| 0 | 0 | |
| 4 | 8.66 | 2.17 |
| 6 | 13.04 | 2.19 |
| 8¼ | 18.73 | 2.53 |
| 9 | 20.37 | 2.19 |

Overall rate of formation of cumene hydroperoxide was about 2.26. The molar yield of cumene hydroperoxide based on cumene reacted was 95%.

*Example 7.*—Using 0.25 gram of sodium nitrate per 100 cc. of cumene sample, cumene was oxidized at 90° C. At 30 weight percent cumene hydroperoxide concentration the rate observed was about 0.9 and the molar yield of cumene hydroperoxide based on cumene reacted was 96%.

*Example 8.*—Using 0.25 gram of potassium nitrate per 100 cc. of cumene sample, cumene was oxidized at 110° C. At 12 weight percent cumene hydroperoxide concentration the rate observed was about 2.3 and the molar yield of cumene hydroperoxide based on cumene reacted was 97.5%.

*Example 9.*—Using a mixture of 0.25 gram of sodium chloride and 0.25 gram of "atomite," a commercial calcium carbonate powder, per 100 cc. of cumene sample, cumene was oxidized in three stages. At 110° C. and from 0 to 8 weight percent of cumene hydroperoxide concentration the overall rate of formation of cumene hydroperoxide was 1.30 weight percent per hour. At 100° C. and from 8 to 17.7 weight percent cumene hydroperoxide concentration, the average rate was 1.25 weight percent per hour. At 90° C. and from 17.7 to 23.2 percent cumene hydroperoxide concentration, the average rate was 0.8 weight percent per hour. The molar yield of cumene hydroperoxide at the end of the run based on cumene reacted was 97 percent.

I claim:

1. The improvement in process for oxidizing cumene to cumene hydroperoxide in liquid phase by elemental oxygen which comprises contacting said cumene during the oxidation period with a normal salt of a strong metallic base and a strong mineral acid, said acid having molecular weight less than 100, and being more than 50% ionized in aqueous solution at 18° C. and normality of 1, said salt being present in solid phase under reaction conditions and being essentially neutral when in aqueous solution.

2. The process as defined in claim 1 wherein the concentration of said normal salt is from 0.1–5 grams per 100 cc. of reaction mixture and said normal salt is in powder form.

3. The process as defined in claim 2 wherein the temperature is from 75°–120° C. and the pressure is about atmospheric during the reaction period.

4. The process as defined in claim 3 wherein a basically-reacting inorganic compound is used in conjunction with said normal salt.

5. The process as defined in claim 3 wherein said normal salt is selected from the group consisting of sodium chloride, potassium chloride, barium sulfate, sodium nitrate, potassium nitrate, calcium chloride, sodium bromide, and their mixtures.

6. The process as defined in claim 5 wherein a basically-reacting inorganic compound is used in conjunction with said normal salt.

7. The process as defined in claim 6 wherein the temperature is in the range from about 90° C. to about 110° C. and the pressure is about atmospheric during the reaction period.

8. The process as defined in claim 7 wherein the normal salt is sodium chloride.

9. The process as defined in claim 7 wherein the normal salt is barium sulfate.

10. The process as defined in claim 7 wherein the normal salt is sodium nitrate.

11. The process as defined in claim 7 wherein the normal salt is potassium nitrate.

12. The process as defined in claim 7 wherein the normal salt is potassium chloride.

References Cited in the file of this patent

UNITED STATES PATENTS

| | | |
|---|---|---|
| 2,613,227 | Joris | Oct. 7, 1952 |
| 2,632,772 | Armstrong et al. | Mar. 24, 1953 |